Patented Dec. 29, 1953

2,664,439

UNITED STATES PATENT OFFICE 2,664,439

PROCESS FOR THE PRODUCTION OF BENZOIC-p-SULFONAMIDE

Hans Feichtinger and Siegfried Puschhof, Duisburg-Beeck, Germany, assignors to Ruhrchemie Aktiengesellschaft, Oberhausen-Holten, Germany, a corporation of Germany No Drawing. Application June 27, 1952,
Serial No. 296,088

Claims priority, application Germany
July 25, 1951

3 Claims. (Cl. 260—518)

This invention relates to a process for the production of benzoic-p-sulfonamide. It more particularly relates to a method for converting a chlorination mixture obtained by chlorinating p-toluene-sulfonic acid sodium salt into the ammonium salt of benzoic-p-sulfonamide according to the Willgerodt reaction.

The conversion of organic compounds containing monovalent or bivalent substituents, as, for example, mercaptans, alkyl halides, alcohols, ketones or thioketones in an aliphatic chain, preferably in the end position thereof, into carboxylic acid amides and carboxylic acids according to the so-called Willgerodt reaction, is known. According to this reaction, the substituted organic compounds are reacted with aqueous ammonium polysulfide solutions or aqueous ammonia solutions and sulfur at an increased temperature and elevated pressure. (See M. Carmack and M. A. Spielman, "The Willgerodt Reaction," Adams "Organic Reactions," vol. III, pages 83 to 107 (1946), published by John Wiley & Sons, Inc., New York, N. Y.) Thus, by means of the Willgerodt reaction, terminal or central aliphatic halide groups may be converted into carboxylic acid amide groups, the carbon structure of which corresponds to that of the particular starting compound.

It is thus possible in accordance with the Willgerodt reaction to convert terminal or central aliphatic halide groups into carboxylic acid amide groups having a carbon structure which corresponds to that of the particular starting compound. It is known that primary halides will give better yields than secondary halides, and the latter will give better yields than tertiary halides. The length of the carbon chain on which the halogen atoms are positioned may vary within certain limits. However, with the longer araliphatic side chains, and especially with higher molecular weight halides, it is of advantage if the halogen atom is a terminal one.

If, in order to produce starting materials for the Willgerodt reaction, methyl groups positioned as a side chain on an aromatic nucleus are chlorinated, the chlorine will enter the side chain in various amounts and will distribute thereon as calculated by Martin and Fuchs for a three-stage chlorination reaction in the gaseous phase (see "Zeitschrift fuer Elektrochemie," vol. 27, page 150 (1921)).

One object of this invention is the production of benzoic-p-sulfonamide from p-toluene sulfonic acid sodium salt which has been chlorinated on the methyl side chain. This and still further objects will become apparent from the following description:

The chlorination on the side chain of dry pulverulent p-toluene-sulfonic acid sodium salt at elevated temperature with irradiation is known. It results in the formation of benzal-chloride-p-sulfonic acid sodium salt (see French Patent 483,690 and German Patents 312,959 and 293,319). It has now been found that if p-toluene sulfonic acid sodium salt is chlorinated in the solid phase, the chlorine will statistically distribute on the methyl side group so that a mixture which contains also benzalchloride-p-sulfonic acid sodium salt and benzo-trichloride-p-sulfonic acid sodium salt in addition to the benzylchloride-p-sulfonic acid sodium salt will form, while a portion of the p-toluene-sulfonic acid sodium salt will remain unconverted. The statistical distribution of the chlorine may be seen from the following table, which gives the composition of the formed chlorination mixture as calculated against the quantity of chlorine taken up.

| Percent by weight chlorine | Percent by weight | | | |
|---|---|---|---|---|
| | $CH_3$-C₆H₄-$SO_3Na$ | $CH_2Cl$-C₆H₄-$SO_3Na$ | $CHCl_2$-C₆H₄-$SO_3Na$ | $CCl_3$-C₆H₄-$SO_3Na$ |
| 0 | 100 | | | |
| 2 | 87 | 12 | | |
| 4 | 76 | 22 | 1 | |
| 6 | 66 | 29 | 3 | |
| 8 | 57 | 35 | 5 | |
| 10 | 48 | 40 | 8 | |
| 12 | 40 | 42 | 11 | 1 |
| 14 | 32 | 43 | 16 | 2 |
| 16 | 25 | 43 | 21 | 4 |
| 18 | 18 | 42 | 26 | 6 |
| 20 | 13 | 39 | 32 | 8 |
| 22 | 9 | 34 | 37 | 11 |
| 24 | 6 | 28 | 42 | 15 |
| 26 | 4 | 22 | 43 | 21 |
| 28 | 3 | 16 | 44 | 30 |
| 30 | 2 | 10 | 42 | 39 |
| | | | 38 | 50 |

Thus, indirect contrast to the prior prevailing conception, chlorinated-p-toluene-sulfonic acid sodium salt which contains stoichiometrically only one gram atom chlorine in the side chain, does not consist of a homogenous benzylchloride-p-sulfonic acid sodium salt, but consists of a mixture of 43% by wt. of benzylchloride-p-sulfonic acid sodium salt
24% by wt. of benzalchloride-p-sulfonic acid sodium salt and
5% by wt. of benzotrichloride-p-sulfonic acid sodium salt.

It has been found in accordance with the invention that any of the chlorination mixtures obtained by the chlorination of the p-toluene sulfonic acid sodium salt may be converted by means of the Willgerodt reaction into the ammonium salt of benzoic-p-sulfonamide if the chlorination mixture is converted into the corresponding sulfo-chloride mixture by heating with the equivalent quantity of phosphorus pentachloride (see Ch. M. Suter, "The Organic Chemistry of Sulfur," published by John Wiley and Sons, Inc., New York, page 458, 1944).

Thus, any of the chlorination mixtures obtained in accordance with the above table may be converted with phosphorus pentachloride into the corresponding sulfo-chloride mixtures. These sulfo-chloride mixtures, it has been found, irrespective of the different chlorination stages contained therein, may be converted by means of the Willgerodt reaction into the ammonium salt of the benzoic-p-sulfonamide. The reaction proceeds in the following manner:

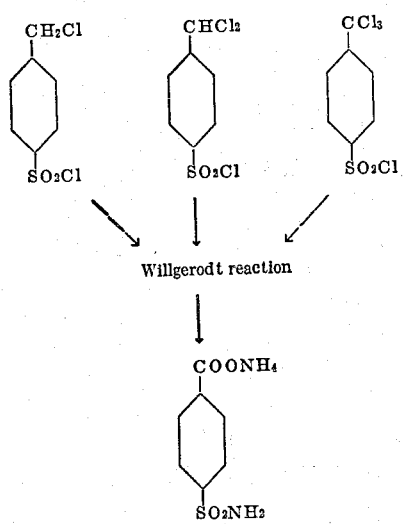

Thus, in accordance with the invention, the oxidation of the chlorinated side chain according to the Willgerodt reaction and the reaction of the sulfo-chloride with the ammonia present in the reaction medium to form sulfonamide takes place simultaneously in one reaction. No difficulties at all are caused by the different chlorination stages. The reaction product which may be freed by evaporation from water, ammonia, hydrogen sulfide and any of the solvents present will give, on acidification with mineral acids and preferably with hydrochloric acid, an excellent yield of benzoic-p-sulfonamide of high purity. This acid is a starting material for numerous important pharmaceutical chemicals and disinfectants, the most important of which being the metallic salts of benzoic-p-sulfonamide chlorinated on the nitrogen atom ("Halazone").

The following examples are given to illustrate the invention and not to limit the same, the invention being limited by the appended claims:

Example 1

120.0 gms. of sodium salt of p-toluene-sulfonic acid chlorinated in the side chain and containing 1.08 gram atoms of chlorine for each gram mole of acid were mixed with 109.4 gms. of phosphorus pentachloride in a glass flask. The content of the flask liquefied in a short time with the evolution of much heat. After the lively reaction was completed, the liquid was heated for one hour over the water bath, whereupon the phosphorus oxychloride formed was distilled off under a vacuum of 100 mm. Hg. A viscous and turbid liquid remained which was distilled under a vacuum of 9 mm. Hg resulting in a fraction distilling between 145 and 172° C. This fraction solidified completely within two hours and supplied 109.4 gms. of sulfo-chloride mixture. The p-toluene-sulfo-chloride could be separated by fine fractionation to such an extent that 90.6 gms. of sulfo-chloride mixture having a chlorine content of 33.15% by weight of Cl were obtained.

This sulfo-chlorination mixture was heated with 500 cc. of aqueous ammonium hydrosulfide solution, 130 gms. of sulfur and 200 cc. of dioxane for six hours at a temperature of 175° C. in an autoclave consisting of a special steel. The temperature was maintained at a constant level within ±1° C. The ammonium hydrosulfide solution contained per liter 14.8 moles $NH_3$ and 0.47 moles $H_2S$. Instead of dioxane, also other organic solvents, as, for example, pyridin, could be used for the dilution.

After cooling, the autoclave was opened and the reaction product was withdrawn in the form of a red-yellow solution. The solution was evaporated to dryness over the water bath and then dissolved in hot water and some active carbon. The clear filtrate was acidified with concentrated hydrochloric acid, thereby directly isolating benzoic-p-sulfonamide which is difficultly soluble in water. After filtration, washing and drying, 53.8 gms. of benzoic-p-sulfonamide corresponding to 68% of the theoretical yield were obtained. The melting point of the product was 280° C. (beginning of the decomposition).

Example 2

80 gms. of sulfo-chloride mixture having a total chlorine content of 33.7% by weight of Cl were prepared in the same manner as described in Example 1 and heated for six hours with 120 gms. of pulverized sulfur, 180 gms. of dioxane and 550 cc. of aqueous ammonia in a steel autoclave. The dioxane served as the organic solvent. The aqueous ammonia solution had a density of 0.895 at 20° C.

The reaction product was worked up in the way as described in Example 1. 55.0 gms. of benzoic-p-sulfonamide corresponding to 80% of the theoretical yield were obtained having a melting point of 283° C. (beginning of the decomposition).

We claim:

1. Process for the production of benzoic-p-sulfonamide, which comprises reacting a chlorination mixture from the chlorination of p-toluene-sulfonic sodium containing benzyl-chloride-p-sulfonic sodium, benzalchloride-p-sulfonic sodium and benzotrichloride-p-sulfonic sodium with phosphorus pentachloride, reacting the resulting analogous sulfo-chloride mixture with a member selected from the group consisting of aqueous ammonium polysulfide solution and aqueous ammonia solution with sulfur at an elevated temperature and pressure, and recovering the ammonium salt of benzoic-p-sulfonamide for acidification to benzoic-p-sulfonamide.

2. Process according to claim 1, in which said reaction of said resulting analogous sulfochloride mixture and said member is effected in the presence of an organic solvent.

3. Process according to claim 2, in which said organic solvent is a member selected from the group consisting of pyridine and dioxane.

HANS FEICHTINGER.
SIEGFRIED PUSCHHOF.

References Cited in the file of this patent

Davies et al., J. Chem. Soc., vol. 1932, pp. 2042–2046.